US012609406B2

(12) United States Patent
Jeong et al.

(10) Patent No.: US 12,609,406 B2
(45) Date of Patent: Apr. 21, 2026

(54) VENTILATION DEVICE FOR POUCH-TYPE SECONDARY BATTERY AND BATTERY MODULE INCLUDING THE SAME

(71) Applicant: SK ON CO., LTD., Seoul (KR)

(72) Inventors: Taek Eon Jeong, Daejeon (KR); Sang Mo Kim, Daejeon (KR); Dong Ju Kim, Daejeon (KR); Jin Go Kim, Daejeon (KR); Sun Min Park, Daejeon (KR); Jae Gyu Byun, Daejeon (KR)

(73) Assignee: SK ON CO., LTD., Seoul (KR)

( * ) Notice: Subject to any disclaimer, the term of this patent is extended or adjusted under 35 U.S.C. 154(b) by 847 days.

(21) Appl. No.: 17/843,681

(22) Filed: Jun. 17, 2022

(65) Prior Publication Data

US 2022/0407169 A1 Dec. 22, 2022

(30) Foreign Application Priority Data

Jun. 18, 2021 (KR) ........................ 10-2021-0079218
Apr. 15, 2022 (KR) ........................ 10-2022-0046950

(51) Int. Cl.
*H01M 50/342* (2021.01)
*H01M 50/105* (2021.01)
(Continued)

(52) U.S. Cl.
CPC ....... *H01M 50/342* (2021.01); *H01M 50/105* (2021.01); *H01M 50/178* (2021.01);
(Continued)

(58) Field of Classification Search
CPC ............. H01M 50/342; H01M 50/105; H01M 50/178; H01M 50/186; H01M 50/211;
(Continued)

(56) References Cited

U.S. PATENT DOCUMENTS 4,689,281 A * 8/1987 Dandona ............. H01M 50/308
429/89
2020/0343499 A1* 10/2020 Yoo ..................... H01M 10/655

FOREIGN PATENT DOCUMENTS

JP        2007-87922 A      4/2007
JP        2007087922 A  *  4/2007
(Continued)

OTHER PUBLICATIONS

Extended European Search Report for European Patent Application No. 22179754.1, mailed Nov. 3, 2022 (9 pages).

*Primary Examiner* — Muhammad S Siddiquee
(74) *Attorney, Agent, or Firm* — Perkins Coie LLP

(57) ABSTRACT

A ventilation device for a secondary battery includes a frame including a first frame and a second frame, and a connector connecting the first frame and the second frame to each other and including a slit portion. Each of the first frame and the second frame includes a facing surface that faces each other, and at least one of the first frame and the second frame includes a ventilation guiding portion recessed from the facing surface. The frame includes a terrace expansion restraining portion including an inclined surface structured to support a pouch terrace portion of the secondary battery and formed at a surface of the frame adjacent to a surface including the ventilation guiding portion. A ventilation control portion is formed to provide a space between the first frame and the second frame to be connected to the ventilation guiding portion.

10 Claims, 8 Drawing Sheets

(51) Int. Cl.

| | |
|---|---|
| *H01M 50/178* | (2021.01) |
| *H01M 50/186* | (2021.01) |
| *H01M 50/211* | (2021.01) |
| *H01M 50/505* | (2021.01) |

(52) U.S. Cl.
CPC ....... *H01M 50/186* (2021.01); *H01M 50/211* (2021.01); *H01M 50/505* (2021.01)

(58) Field of Classification Search
CPC ............. H01M 50/505; H01M 10/613; H01M 10/647; H01M 10/6556; H01M 50/242; H01M 50/308; H01M 50/358; H01M 50/30; H01M 50/204; H01M 50/35; H01M 50/503; H01M 50/507; Y02E 60/10
See application file for complete search history.

(56) References Cited

FOREIGN PATENT DOCUMENTS

| | | | | |
|---|---|---|---|---|
| JP | 2008204816 | A | * | 9/2008 |
| KR | 10-2006-0112746 | A | | 11/2006 |
| KR | 10-2013-0090262 | A | | 8/2013 |
| KR | 10-1789804 | B1 | | 10/2017 |
| KR | 10-1858790 | B1 | | 5/2018 |
| KR | 10-2112670 | B1 | | 5/2020 |
| KR | 10-2020-0077634 | A | | 7/2020 |

* cited by examiner

VENTILATION DEVICE FOR POUCH-TYPE SECONDARY BATTERY AND BATTERY MODULE INCLUDING THE SAME

PRIORITY CLAIM AND CROSS-REFERENCE TO RELATED APPLICATION

This patent document claims the priority and benefits of Korean Patent Applications No. 10-2021-0079218 filed at the Korean Intellectual Property Office (KIPO) on Jun. 18, 2021 and No. 10-2022-0046950 filed at the KIPO on Apr. 15, 2022. The entire contents of each application are incorporated by reference in this document in their entirety.

TECHNICAL FIELD

This patent document relates to a ventilation device for a pouch-type secondary battery and a battery module including the same.

BACKGROUND

The rapid growth of electric vehicles and portable devices, such as camcorders, mobile phones, and laptop computers, has brought increasing demands for secondary batteries, which can be charged and discharged repeatedly.

Examples of the secondary batteries include lithium secondary batteries, nickel-cadmium batteries, and nickel-hydrogen batteries. The lithium secondary batteries are now widely used due to certain advantages over other types of batteries, including, e.g., high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

When a pouch-type lithium secondary battery is exposed to a harsh environment, a gas may be continuously generated inside of the battery, increasing an internal pressure of the pouch. If the internal pressure is increased beyond a tolerable critical value, a sealing portion at the weakest portion of the pouch may be damaged to cause a ventilation. The ventilation may occur randomly in the pouch, and the location where the ventilation occurs may not be easily predicted.

In order to address such issues, some lithium secondary battery designs include a lamination film is welded at a sealing portion of a pouch-type battery to induce a directional venting of a gas generated in the pouch. However, sufficient venting inducing effects and battery cell stability may not be provided.

SUMMARY

This patent document discloses technical features and examples for a ventilation device for a pouch-type secondary battery having improved ventilation control properties.

According to an aspect of the disclosed technology, there is provided a battery module having improved ventilation control properties.

According to exemplary embodiments of the disclosed technology, a ventilation device for a pouch-type secondary battery includes a frame including a first frame and a second frame, and a connector connecting the first frame and the second frame to each other and having a slit portion formed therein. Each of the first frame and the second frame has a facing surface to each other, and at least one of the first frame and the second frame includes a ventilation guiding portion recessed from the facing surface. A terrace restraining portion having an inclined surface is formed at a surface of the frame adjacent to a surface including the ventilation guiding portion. A ventilation control portion is formed as a space between the first frame and the second frame to be connected to the ventilation guiding portion.

In some embodiments, the inclined surface of the terrace restraining portion may be included in each of the first frame and the second frame.

In some embodiments, the inclined surface of the terrace restraining portion included in the first frame and the inclined surface of the terrace restraining portion included in the second frame may be inclined in opposite directions.

In some embodiments, an inclination angle of the inclined surface of the terrace restraining portion may be from 5° to 50°.

In some embodiments, the connector may extend from a rear surface of the first frame to be connected to a rear surface of the second frame. The first frame may have a first frame facing surface facing the second frame and a first ventilation guiding surface recessed from the first frame facing surface. The second frame may have a second frame facing surface facing the first frame and a second ventilation guiding surface recessed from the second frame facing surface. The ventilation guiding portion may be formed between the first ventilation guiding surface and the second ventilation guiding surface.

In some embodiments, the ventilation guiding portion may include a venting groove.

In some embodiments, the ventilation guiding portion may include a venting hole.

In some embodiments, an inner shape of the venting hole may include at least one of a cylindrical shape, a semi-cylindrical shape, a funnel shape and a polygonal pillar shape.

In some embodiments, the ventilation device may further include a cap fitted to the ventilation guiding portion.

In some embodiments, the cap may include a material having a ductility greater than that of a material of the frame.

In some embodiments, the slit portion may have subventing hole having the same shape as that of the ventilation guiding portion at a position corresponding to the ventilation guiding portion.

In some embodiments, an interval between the first frame and the second frame may be from 0.1 mm to 10 mm.

According to exemplary embodiments of the disclosed technology, a battery module includes a plurality of battery cells stacked on each other, each of the plurality of battery cells comprising an electrode lead, and a bus bar assembly coupled to an end from which the electrode leads of the plurality of battery cells are drawn out to connect the plurality of battery cells to each other. The bus bar assembly includes a main frame including a slit portion from which the electrode leads of the plurality of battery cells are drawn out, a bus bar mounted on an outer surface of the main frame to electrically connect the electrode leads drawn out through the slit portion to each other, and a plurality of inner frames spaced apart from each other on an inner surface of the main frame to guide the electrode lead to the slit portion. The plurality of inner frames includes a first inner frame and a second inner frame neighboring each other, and the first inner frame includes a ventilation guiding portion recessed from a surface facing the second inner frame. A terrace restraining portion having an inclined surface is formed at a surface of the first inner frame adjacent to a surface including the ventilation guiding portion. A ventilation control portion is formed as a space between the first inner frame and the second inner frame to be connected to the ventilation guiding portion.

In some embodiments, the first inner frame may have a first inner frame facing surface facing the second inner frame, and a first inner ventilation guiding surface recessed from the first inner frame facing surface. The second inner frame may have a second inner frame facing surface facing the first inner frame, and a second inner ventilation guiding surface recessed from the second inner frame facing surface. The ventilation guiding portion may be formed between the first inner ventilation guiding surface and the second inner ventilation guiding surface.

In some embodiments, the plurality of battery cells may each include an electrode assembly and a pouch for accommodating the electrode assembly. The pouch may include a sealing portion formed at an outside the electrode assembly and a terrace portion adjacent to the sealing portion. The electrode lead and the sealing portion may be at least partially located in the ventilation control portion.

In some embodiments, at least a portion of the sealing portion may be in contact with at least a portion of the first inner frame facing surface and the second inner frame facing surface in the ventilation control portion.

In some embodiments, the sealing portion may include a side sealing portion sealing an end from which the electrode lead is drawn out, and a main sealing portion sealing a side from which the electrode lead is not drawn out. The main sealing portion may have a folding portion in which the pouch is folded at an edge thereof. A contact area of the side sealing portion with the first inner frame facing surface and the second inner frame facing surface may be from 200 mm² to 20,000 mm².

In some embodiments, at least a portion of the terrace portion may be in contact with the terrace restraining portion.

In some embodiments, a contact area between the terrace portion and the terrace restraining portion may be from 100 mm² to 10,000 mm².

In some embodiments, an inclination angle of the inclined surface of the terrace restraining portion may be from 5° to 50°.

In some embodiments, an inner shape of the ventilation guiding portion may include at least one of a cylindrical shape, a semi-cylindrical shape, a funnel shape and a polygonal pillar shape.

In some embodiments, the battery module may further include a cap fitted to the ventilation guiding portion.

In some embodiments, the cap may include a material having greater ductility than that of the plurality of inner frames.

In some embodiments, an interval between the plurality of inner frames is from 0.1 mm to 10 mm.

In some embodiments, the slit portion may have a subventing hole having the same shape as that of the ventilation guiding portion at a position corresponding to the ventilation guiding portion.

In a ventilation device for a pouch-type secondary battery according to embodiments of the disclosed technology, a ventilation caused by a gas generated at an inside of the pouch may be delayed. The gas may be induced in a specific direction to be discharged even when a ventilation occurs, so that damage or explosion of a battery cell may be prevented.

In some embodiments, a pouch expansion may be suppressed by a ventilation control portion of the ventilation device to prevent or delay the vent.

In some embodiments, the ventilation device for a pouch-type secondary battery may guide a direction of the gas to a ventilation guiding portion, so that a region or a time of the ventilation generation may be predicted. Further, an additional device (e.g., a venting unit) may be omitted so that productivity of the secondary battery or a battery module may be enhanced.

In a battery module including the ventilation device for a pouch-type secondary battery according to exemplary embodiments, a ventilation may be controlled to maintain stability even when a pressure at an inside of a battery pouch may be increased beyond an appropriate level. Accordingly, stability of the battery cell may be achieved and deterioration of a battery cell performance may be prevented.

DETAILED DESCRIPTION OF THE EMBODIMENTS

According to exemplary embodiments of the disclosed technology, a ventilation device for a pouch-type secondary battery capable of reducing or delaying a gas generated in a battery cell is provided. According to exemplary embodiments, a battery module including the ventilation device is also provided.

Hereinafter, the disclosed technology will be described in detail with reference to embodiments and the accompanying drawings. However, those skilled in the art will appreciate that such embodiments described with reference to the accompanying drawings are provided to further understand the spirit of the disclosed technology and do not limit subject matters to be protected as disclosed in the detailed description and appended claims.

The term "frame" used herein refers to an element of a ventilation device capable of controlling a direction of a gas generated in a battery cell in combination with a battery cell. A first frame and a second frame are designated merely to be distinguished from each other, and positions or orders thereof are not specifically limited by the terms "first" and "second."

Figure 1:
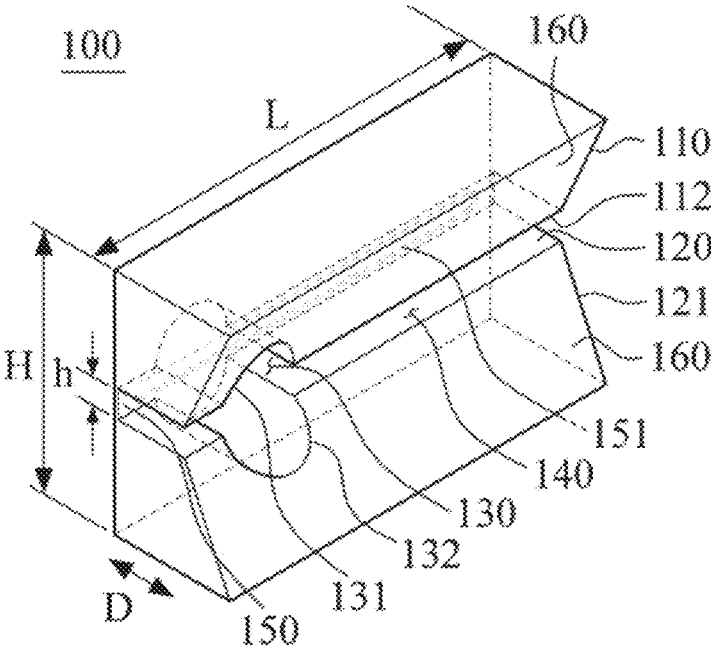
FIG. 1 is a schematic perspective view illustrating a ventilation device for a pouch-type secondary battery in accordance with exemplary embodiments.

FIG. 1 is a schematic perspective view illustrating a ventilation device for a pouch-type secondary battery in accordance with exemplary embodiments.

In a ventilation device 100 for a pouch-type secondary battery of in FIG. 1, "L" refers to a length direction from a left side to a right side, or from the right side to the left side of the first frame and the second frame; "H" refers to a height direction upwardly or downwardly; "D" refers to a thickness direction from a front face to a rear face or from the rear face to the front face; and "h" refers to an interval between the first frame and the second frame.

In FIG. 1, an interval between the first frame and the second frame may be a sufficiently close distance by which, e.g., a portion of a cell pouch may be in contact with the first frame and the second frame when the battery cell is inserted between the first frame and the second frame.

Referring to FIG. 1, a ventilation device 100 for a pouch-type secondary battery (hereinafter, abbreviated as a ventilation device) according to an exemplary embodiment may include a first frame 110, a second frame 120, and a connector 150 connecting the first frame 110 and the second frame 120 with each other. The first frame 110 and the second frame 120 may face each other.

The connector 150 may include a slit portion 151 as an opening that extends between the first frame 110 and the second frame 120. In FIG. 1, the connector 150 and the slit portion 151 are indicated with dotted lines in consideration of the interval between the first frame 110 and the second frame 120.

The "frame" used herein may refer to at least one of the first frame 110 or the second frame 120.

One surfaces of the first frame 110 and the second frame 120 may face each other. The first frame 110 may include a first frame facing surface 112 facing the second frame 120, and the second frame 120 may include a second frame facing surface 122 facing the first frame 110.

The first frame 110 and the second frame 120 may be fixed and connected to each other by the connector 150. For example, the connector 150 may extend from a rear surface of the first frame 110 to be connected to a rear surface of the second frame 120.

The connector 150 may include, e.g., the slit portion 151. For example, the slit portion 151 may extend between the first frame 110 and the second frame 120 such that an electrode lead of the battery cell may be inserted through the slit portion 151 in a thickness direction of the first frame 110 and the second frame 120 when the battery cell is inserted into the ventilation device 100. A size or a length of the slit portion 151 may be appropriately adjusted within a range by which the electrode lead of the battery cell may be inserted.

At least one of the first frame 110 and the second frame 120 may include a ventilation guiding portion 130 recessed at the facing surface. In the specific examples shown in FIGS. 1, 2A-2D, both the first and second frames 110 and 120 are structured to include such a ventilation guiding portion 130. In other implementations, only one frame 110 or 120 may include a ventilation guiding portion 130.

In an embodiment, a terrace restraining portion 160 having an inclined surface may be formed at a surface adjacent to a surface including the ventilation guiding por-tion 130 in the frames 110 and 120. The terrace restraining portion 160 is structured with an inclined surface formed at a surface of the frame adjacent to a surface including the ventilation guiding portion 130.

In some implementations, the terrace restraining portion 160 is structured to support a terrace portion of a pouch to restrain expansion of the pouch.

Further, in some implementations, a ventilation control portion 140 may be formed to connect to the ventilation guiding portion 130 and is used to provide a space formed between the first frame 110 and the second frame 120.

For example, the first frame 110 may include the first frame facing surface 112 facing the second frame 120 and a first ventilation guiding surface 131 formed by being recessed from the first frame facing surface 112. The second frame 120 may include the second frame facing surface 122 facing the first frame 110 and a second ventilation guiding surface 132 formed by being recessed from the second frame facing surface 122. The ventilation guiding portion 130 may be formed between the first ventilation guiding surface 131 and the second ventilation guiding surface 132.

For example, the first ventilation guiding surface 131 recessed from the first frame facing surface 112 and the second ventilation guiding surface 132 recessed from the second frame facing surface 122 may face each other to form a venting groove or a venting hole as the ventilation guiding portion 130.

A position at the frames 110 and 120 of the ventilation guiding portion 130 or a shape of the ventilation guiding portion 130 may be properly adjusted.

FIGS. 2A to 2D and FIGS. 3A to 3B are schematic perspective views illustrating ventilation devices for a pouch-type secondary battery in accordance with some exemplary embodiments.

Detailed descriptions on elements or structures substan-tially the same as or similar to those described with reference to FIG. 1 are omitted herein.

Figure 2A:
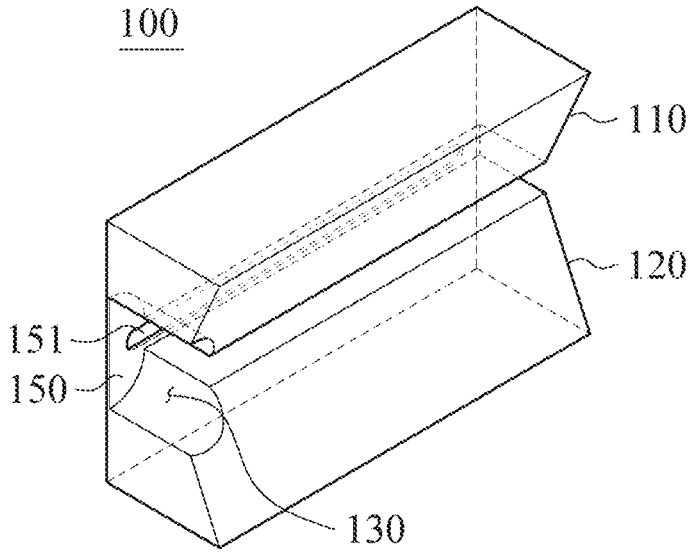
FIGS. 2A to 2D are schematic perspective views illustrating ventilation devices for a pouch-type secondary battery in accordance with some exemplary embodiments.

Referring to FIG. 2A, the ventilation guiding portion 130 may be formed at an edge of the frames 110 and 120. For example, the ventilation guiding portion 130 may be adja-cent to one end of the slit portion 150 and may be opened to an outside of the frames 110 and 120.

Figure 2B:
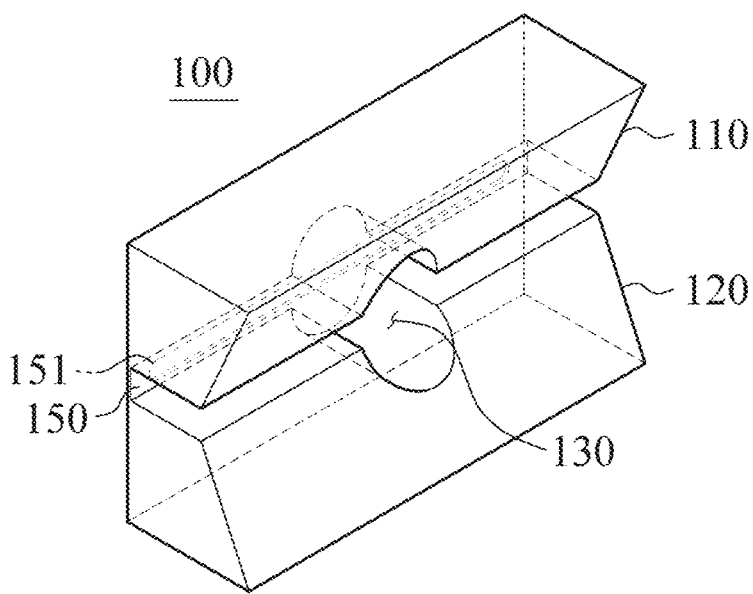
Figure 2C:
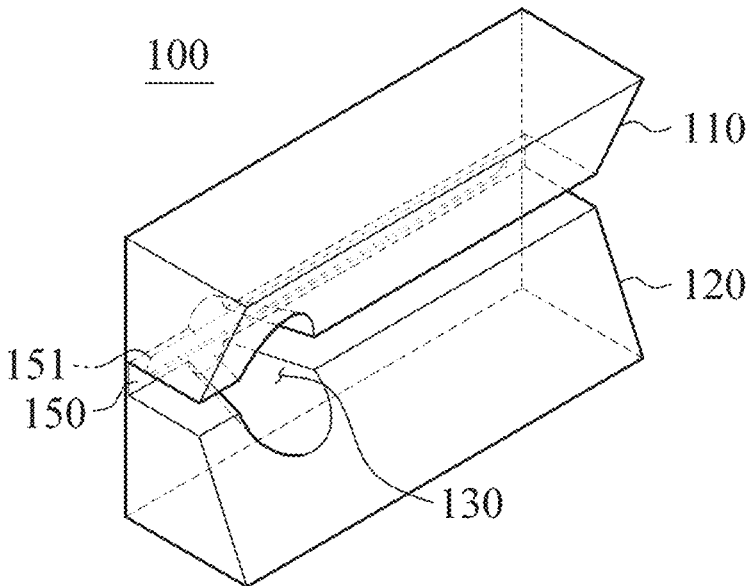
Figure 2D:
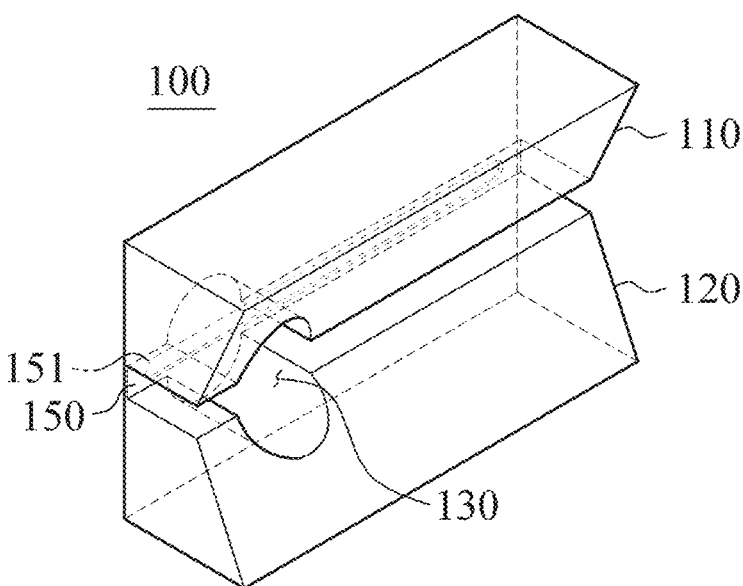

Referring to FIGS. 2B to 2D, the ventilation guiding portion 130 may be formed at an inner region of the first frame 110 and the second frame 120.

Figure 3A:
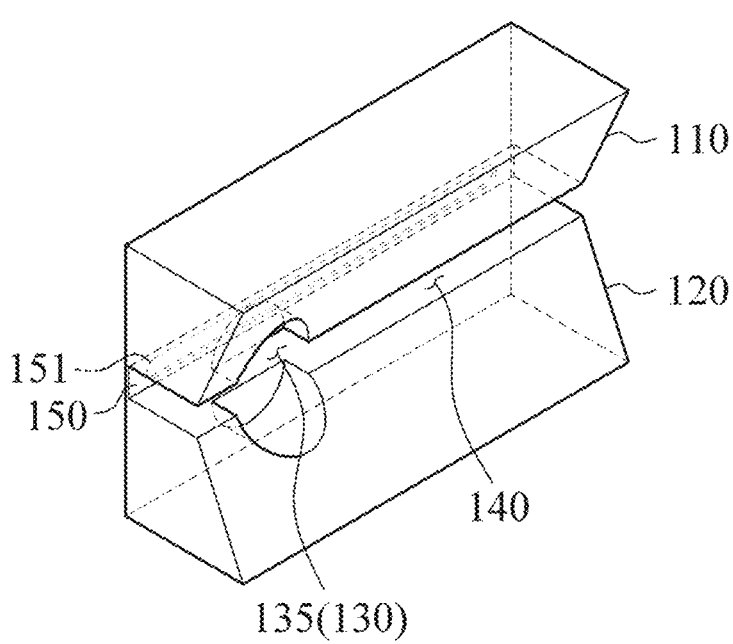
FIGS. 3A to 3B are schematic perspective views illustrating ventilation devices for a pouch-type secondary battery in accordance with some exemplary embodiments.

Referring to FIG. 3A, the ventilation guiding portion 130 may include a venting groove 135. For example, the venting groove 135 may include a groove formed at a front surface of the first frame 110. For example, the venting groove 135 may be recessed from the front surface of the first frame 110 and spaced apart from the rear surface of the first frame 110.

Figure 3B:
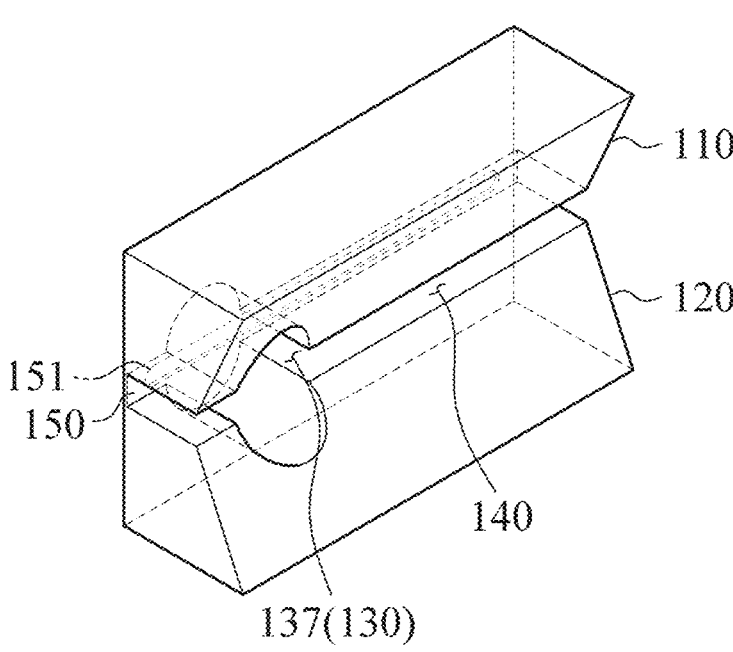

Referring to FIG. 3B, the ventilation guiding portion 130 may include a venting hole 137. For example, the venting hole 137 may be a hole or an opening formed at the front surface of the first frame 110. For example, the venting hole 137 may be a hole extending from the front surface of the first frame 110 to the rear surface of the first frame 110.

The venting groove 135 or the venting hole 137 may serve as a passage through which a gas may be discharged to the outside, when the battery cell is inserted between the first frame 110 and the second frame 120 and a ventilation occurs due to an increase of an internal pressure of the pouch during a battery operation.

In an embodiment, an inner shape of the venting hole 137 may include, e.g., at least one of a cylindrical shape, a semi-cylindrical shape, a funnel shape and a polygonal pillar shape.

As illustrated in FIGS. 2A to 2D, the inner shape of the venting hole 137 may be the cylinder shape, the semi-cylindrical shape or the funnel shape.

For example, as illustrated in FIG. 2C, the venting hole 137 may have the funnel shape. For example, the venting hole 137 may have the funnel shape in which a width becomes narrower from the front surface to the rear surface of the frames 110 and 120. Alternatively, the venting hole 137 may have the funnel shape in which the width becomes wider from the front surface to the rear surface of the frames 110 and 120.

For example, the venting hole 137 may have a triangular pillar shape or an octagonal pillar shape.

In exemplary embodiments, a remainder space in which the pouch may be expanded when the gas is generated in the pouch may be provided by the ventilation guiding portion 130 serving as the venting groove or the venting hole. Thus, the gas may be induced to the ventilation guiding portion 130. Accordingly, the ventilation may be easily controlled or induced without additional components or equipment.

In an embodiment, if the inner shape of the venting hole is any one selected from the cylindrical shape, the semi-cylindrical shape and the funnel shape, an average diameter may be from 1 mmΦ to 500 mmΦ, preferably from 5 mmΦ to 100 mmΦ. In the above range, the gas induction and exhaustion to the ventilation guiding portion 130 may be promoted.

Figure 4:
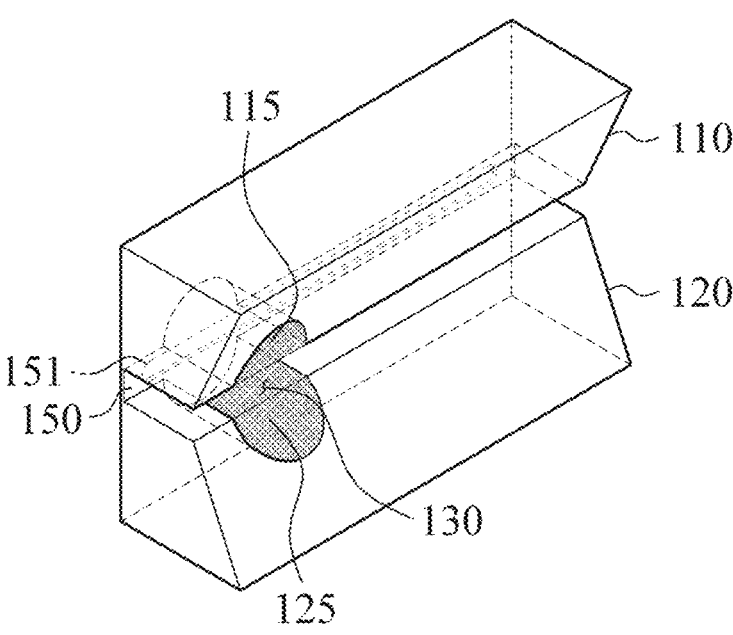
FIG. 4 is a schematic perspective view illustrating a ventilation device for a pouch-type secondary battery in accordance with some exemplary embodiments.

FIG. 4 is a schematic perspective view illustrating a ventilation device for a pouch-type secondary battery in accordance with some exemplary embodiments.

Referring to FIG. 4, the venting guiding portion 130 may further include caps 115 and 125.

In this case, a portion of the battery cell pouch, e.g., a pouch sealing portion may be in contact with a first cap 115 and/or a second cap 125 in the ventilation guiding portion 130. In exemplary embodiments, the caps 115 and 125 may include a soft material that is more physically deformable than a material of the frames 110 and 120 is.

In an embodiment, when a pressure of a predetermined value or more is applied to the caps 115 and 125 in the height, thickness or length direction of the frames 110 and 120, the caps 115 and 125 may be separated from the frame 110 and 120.

In an embodiment, when a heat of a predetermined value or more is applied to the caps 115 and 125 in the height, thickness, or length direction of the frame 110 and 120, the caps 115 and 125 may be melted.

In some embodiments, the caps 115 and 125 may include a low melting point material. For example, the caps 115 and 125 may include tin (Sn), zinc (Zn), lead (Pb), bismuth (Bi), indium (In), etc. Accordingly, the caps 115 and 125 may be transformed into a flowable state by a heat or a gas generated in a harsh environment. Thus, a gas exhaust passage may be formed by the deformation of the caps 115 and 125.

Figure 5A:
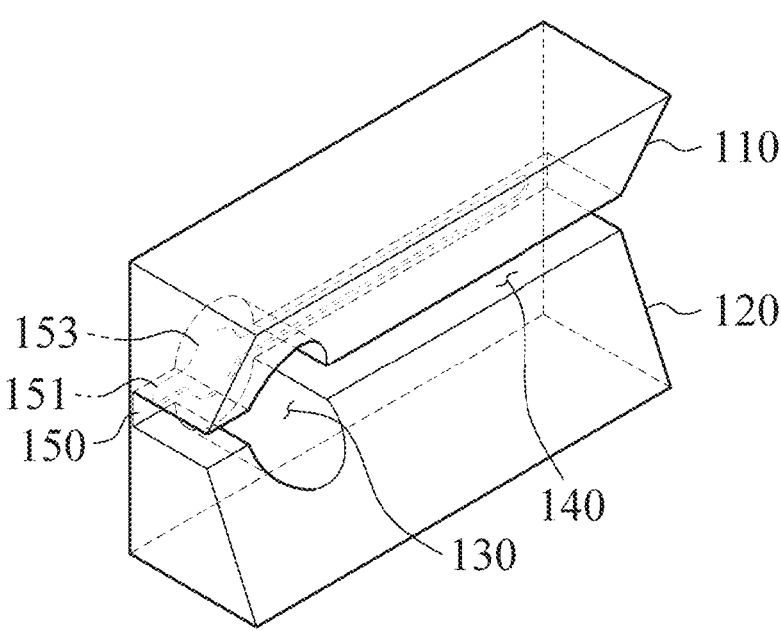
FIGS. 5A and 5B are schematic perspective views illustrating ventilation devices for a pouch-type secondary battery in accordance with some exemplary embodiments.
Figure 5B:
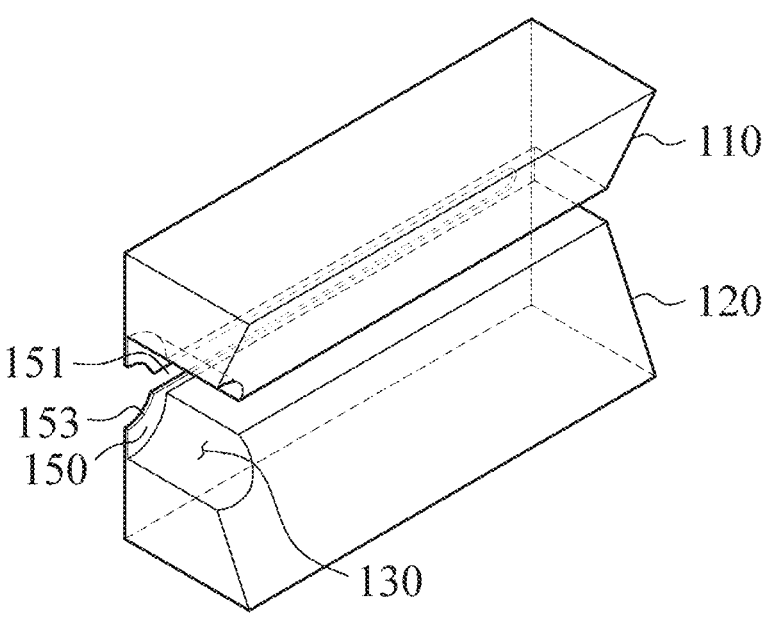

FIGS. 5A and 5B are schematic perspective views illustrating ventilation devices for a pouch-type secondary battery in accordance with some exemplary embodiments.

Referring to FIGS. 5A and 5B, the slit portion 151 may include a sub-venting hole 153 having substantially the same shape as that of the ventilation guiding portion 130 at a position corresponding to the ventilation guiding portion 130. Thus, an additional passage for an external discharge of gas when the ventilation occurs may be provided.

As illustrated in FIG. 5A, the ventilation guiding portion 130 may be formed at an inside of the frames 110 and 120, and the sub-venting hole 153 may also be formed in the slit portion 151.

As illustrated in FIG. 5B, the ventilation guiding portion 130 may be formed at one end of the frames 110 and 120, and the sub-venting hole 153 may also be formed at one end of the slit portion 151 to be opened to an outside of the connector 150.

As described above, the sub-venting hole 153 may be formed at a position corresponding to the ventilation guiding portion 130, and may have a shape corresponding to that of the ventilation guiding portion 130, so that a structure more advantageous to a ventilation control may be provided.

Referring to FIG. 1 again, a terrace restraining portion 160 including an inclined surface may be formed at an inner surface of the first frame 110 and the second frame 120 facing the battery cell (e.g., a surface adjacent to the surface including the ventilation inducing portion 130). When the battery cell is inserted between the frames 110 and 120, a portion of the pouch, e.g., a terrace portion of the pouch may be in direct contact with the terrace restraining portion 160. Thus, the ventilation may be controlled by restraining expansion of the pouch more effectively when the pouch is inflated due to an increase of an inner pressure during a battery operation.

In an embodiment, the inclined surface of the terrace restraining portion 160 may be included in one surface of the first frame 110 or the second frame 120, or may be included in one surface of each of the first frame 110 and the second frame 120. As illustrated in FIG. 1, the inclined surfaces of the terrace restraining portion 160 are included in each of the first frame 110 and the second frame 120, and the inclined surfaces may be opposite to each other.

An inclination angle of the inclined surface of the terrace restraining portion 160 may be from 5° to 50°. In the above range, the pouch may be in close contact with the pouch to suppress the expansion of the pouch, thereby effectively controlling the ventilation.

As shown in FIG. 1, the connector 150 is shaped to connect the two frames 110 and 120 to be separated from each other by a space therebetween as the ventilation control portion 140. Accordingly, this construction allows the ventilation control portion 140 to be provided as a space formed between the first frame 110 and the second frame 120, and to connect to the ventilation guiding portion 130.

For example, the ventilation control portion 140 may be formed between the first frame 110 and the second frame 120 along the length direction designated as L of the frames 110 and 120, and may be connected to the ventilation guiding portion 130. For example, when an electrode lead of the battery cell may be inserted into the slit portion 151 of the ventilation device 100, a sealing portion of the pouch of the battery cell may be in contact with a surface of the frame 110 and 120 in the ventilation control portion 140.

For convenience of illustration, in FIG. 1, the interval between the frames 110 and 120 is illustrated as being relatively larger than an actual interval. However, the interval between the frames 110 and 120 may be a sufficiently small so that the portion of the battery cell may contact the surface of the frame when the battery cell is inserted between the frames 110 and 120.

Accordingly, when the gas is generated in the pouch, a space for an expansion of the pouch may be reduced, so that the pouch expansion may be suppressed. Accordingly, the generation of the ventilation may be interrupted or delayed.

In some embodiments, the interval between the first frame 110 and the second frame 120 may be from 0.1 mm to 10 mm. The interval between the first frame 110 and the second frame 120 is designated as h in FIG. 1, and the interval h may be preferably from 2 mm to 5 mm. In the above range of the interval, the battery cell may be inserted and fixed in the ventilation device 100 and the pouch expansion may be effectively suppressed during an operation of the battery cell.

In some embodiments, a length of each of the first frame 110 and the second frame 120 in the direction designated as L may be from 10 mm to 500 mm, a height in the direction designated as H may be from 1 mm to 50 mm, and a thickness in the direction designated as D may be from 1 mm to 50 mm. Preferably, the length may be from 5 mm to 300 mm, the height may be from 5 mm to 30 mm, and the thickness may be from 5 mm to 30 mm.

A size or a shape of the ventilation device 100 may be property variously modified within a range in which the battery cell may be easily applied to the ventilation device 100, and a ventilation direction may be controlled by applying the battery cell to the ventilation device 100.

In an embodiment, the frames 110 and 120 may include a material having high rigidity and high elasticity to withstand physical and chemical forces applied from the outside. Further, the connector 150 may include the same material as that of the frames 110 and 120.

In an embodiment, the frames 110 and 120 may include a material having higher rigidity or elasticity than a material included in the caps to provide improved durability in harsh conditions. For example, the frames 110 and 120 may include a plastic, a metal, a ceramic, or the like. For example, the plastic may include a widely used plastic, an engineering plastic, etc. The metal may include aluminum, copper, iron, stainless steel, etc. The polymer may include a rubber, polyurethane foam, etc.

In some embodiments, the first frame 110, the second frame 120 and the connector 150 may be integral with each other.

A pouch-type battery cell unit according to an exemplary embodiment may be implemented by inserting the battery cell into the above-described ventilation device for a pouch-type secondary battery.

Figure 6:
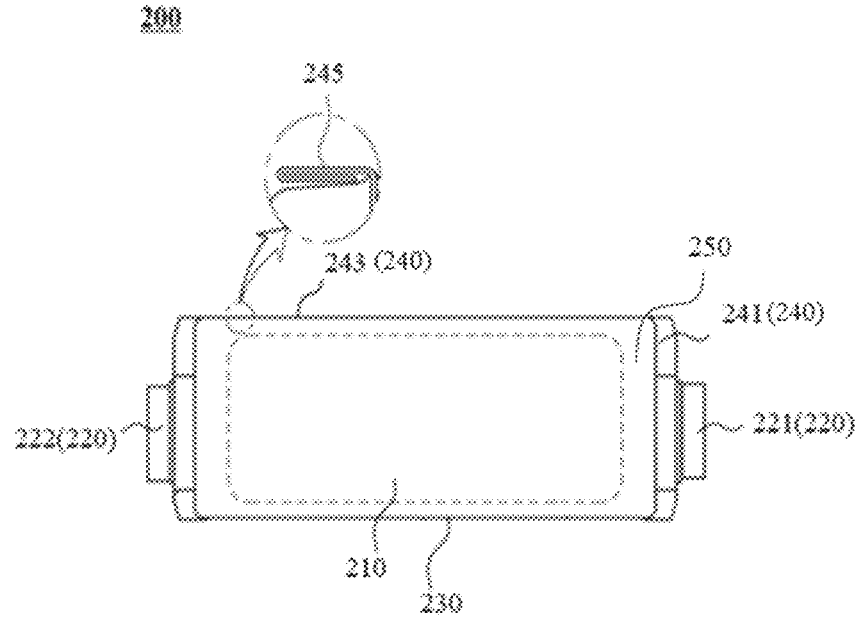
FIG. 6 is a schematic top plan view of a battery cell in accordance with exemplary embodiments.

FIG. 6 is a schematic top plan view of a battery cell in accordance with exemplary embodiments.

Referring to FIG. 6, a battery cell 200 may include an electrode assembly 210 having an electrode lead 220 formed at one end thereof and a pouch 230 accommodating the electrode assembly 210.

The term "electrode lead 220" used herein may refer to at least one of the first electrode lead 221 and the second electrode lead 222.

The pouch 230 may include a sealing portion 240 formed at an outside of the electrode assembly 210. A terrace portion 250 may be formed between the electrode assembly 210 and the sealing portion 240. The terrace portion 250 may be a space in the pouch 230 excluding the electrode assembly 210 among a portion for accommodating the electrode assembly.

The sealing portion 240 may include a side sealing portion 241 for sealing an end from which the electrode lead 220 is drawn out, and a main sealing portion 243 for sealing a side from which the electrode lead 220 is not drawn out. A folding portion 245 may be formed by folding the pouch 230 at an edge of the main sealing portion 243.

The side sealing portion 241 may be a sealing portion located in a direction in which the electrode lead is drawn out of sealing portions formed at the outside of the electrode assembly. The main sealing portion 243 may be a sealing portion connected to the side sealing portion 241 and located in a direction in which the electrode lead is not drawn out. The folding portion 245 may refer to a structure in which the pouch extends at the edge of the main sealing portion 243 to be folded.

For example, an unnecessary space between adjacent battery cells may be reduced when assembling a battery module by forming the folding portion 243. The folding portion 243 may be formed to be smaller than a thickness of the electrode assembly and may not protrude. Thus, the adjacent battery cells may be disposed more closely to increase a volumetric efficiency of the battery module.

Figure 7:
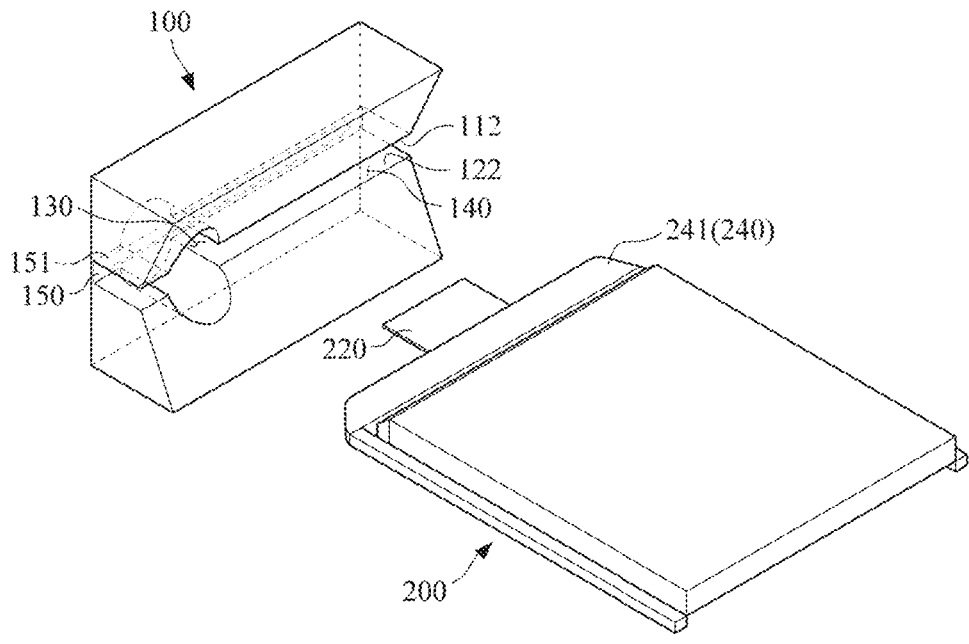
FIG. 7 is a schematic perspective view illustrating a battery cell unit in accordance with exemplary embodiments.

FIG. 7 is a schematic perspective view illustrating a battery cell unit in accordance with exemplary embodiments.

Referring to FIG. 7, the battery cell 200 may be inserted into the ventilation device 100. For example, the electrode lead 220 of the battery cell 200 may be inserted into the slit portion 151 of the ventilation device 100 from the front surface to the rear surface of the frames 110 and 120. In this case, portions of the electrode lead 220 and the sealing portion 240 of the battery cell 200 may be located in the ventilation control portion 140. For example, the side sealing portion 241 may be located in the ventilation control portion 140 to be contact with the first frame facing surface 112 and the second frame facing surface 122. Further, the pouch terrace portion 250 may be in direct contact with the terrace restraining portion 160.

The sealing portion 240 of the pouch may contact the frame facing surfaces 112 and 122, so that expansion of the pouch may be suppressed by the frames 110 and 120 even when gas is generated in the pouch. Thus, the sealing portion 240 may be prevented from being disassembled due to the gas expansion, thereby suppressing or delaying occurrence of the vent. Further, the pouch terrace portion 250 may be in direct contact with the terrace restraining portion 160 to more effectively control the vent.

Figure 8:
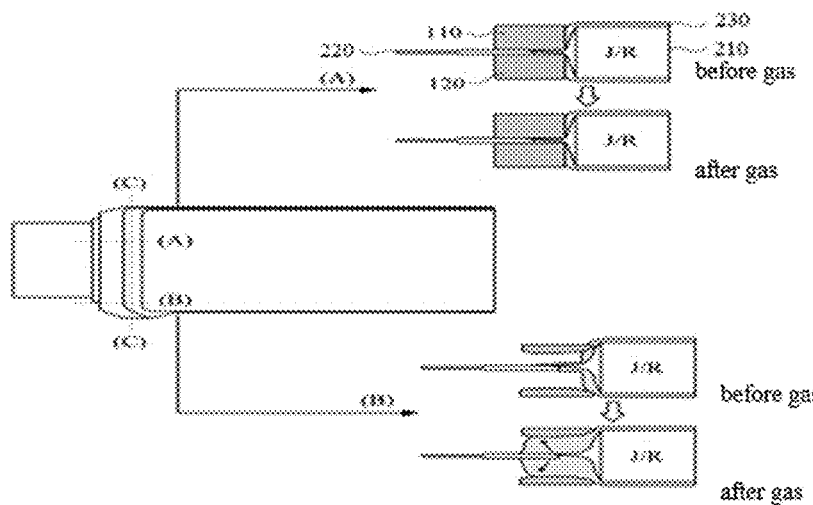
FIG. 8 is a schematic diagram for describing an operation mechanism of a battery cell unit in accordance with exemplary embodiments.

FIG. 8 is a schematic diagram for describing an operation mechanism of a battery cell unit in accordance with exemplary embodiments.

In a region (A) of FIG. 8, the venting may be controlled by the ventilation control portion 140. In a region (B) of FIG. 8, the venting may be induced by the ventilation guiding portion 130.

When the pouch 230 of the battery cell 200 expands, the region (A) of the ventilation control portion 140 may directly contact the first frame 110 and the second frame 120 to suppress an expansion of the sealing portion 240. Accordingly, a ventilation generation relay be delayed or suppressed, and a ventilation control may be implemented.

In the region (B) of the ventilation guiding portion 130, an expansion of the sealing portion 240 may be relatively allowed. Thus, the gas generated in the pouch 230 may be transferred to the region (B), and the pouch 230 may be expanded.

Additionally, when an internal pressure of the pouch may become equal to or greater than an adhesive force of the sealing portion 240 by the gas generated in the pouch, the sealing portion 240 may be opened to cause an exhaustion of the gas to the outside.

As described above, the gas generated in the pouch 230 may be exhausted through the ventilation guiding portion 130. Accordingly, damages or explosion of the battery cell may be prevented. Additionally, a direction of the gas exhaustion may be controlled by the ventilation guiding portion 130, so that a ventilation generation location may be easily predicted.

As described above, even when an internal pressure of the secondary battery is increased to an appropriate level or more, the venting may be controlled to improve a durability to pressure. Accordingly, stability of the battery may be enhanced and deterioration of a battery performance may be prevented.

Figure 9:
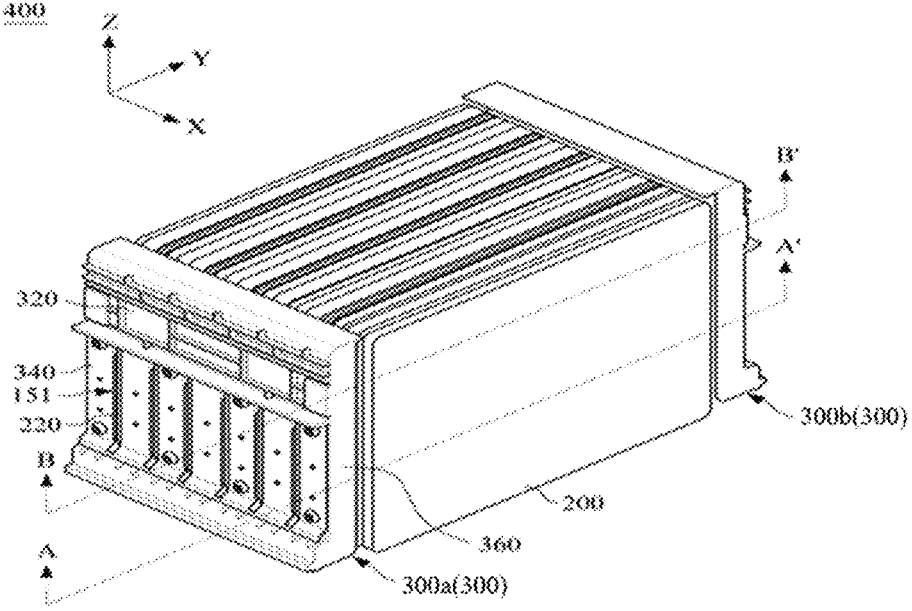
FIG. 9 is a schematic perspective view illustrating a battery module in accordance with exemplary embodiments.

FIG. 9 is a schematic perspective view illustrating a battery module in accordance with exemplary embodiments.

The battery module according to exemplary embodiments may include the battery cell units applied to the ventilation device 100 as described above.

Referring to FIG. 9, a battery module 400 may include a plurality of the battery cells 200. In an embodiment, the plurality of the battery cells 200 may be stacked by a surface contact with each other. For example, the plurality of the battery cells 200 stacked on each other may form a battery stack, and the plurality of the battery cells 200 may be electrically connected to each other by a bus bar assembly 300.

Each battery cell 200 may be a pouch-type battery in which the electrode assembly 210 may be encapsulated by the pouch 230 as illustrated in FIG. 6. For example, the battery cell 200 may include the electrode assembly 210 having an electrode lead 220 formed at one end thereof, and the pouch 230 accommodating the electrode assembly 210.

As described above, the pouch 230 may include the sealing portion 240 formed at an outside of the electrode assembly 230. Further, a terrace portion 250 may be formed adjacent to the sealing portion 240.

As illustrated in FIG. 9, the busbar assembly 300 may include a first busbar assembly 300a disposed at one end of the battery stack, and a second busbar assembly 300b disposed at the other end of the battery stack. The first bus bar assembly 300a and the second bus bar assembly 300b may face each other and may be spaced apart from each other with the battery stack interposed therebetween.

In exemplary embodiments, the bus bar assembly 300 may include a main frame 320, a bus bar 340 and an inner frame 360.

The bus bar assembly 300 may be coupled to one end and the other end of the battery stack. The electrode leads 220 drawn out from both ends of each battery cell 200 may be inserted into the slit portion 151 formed in the main frame 320 of the bus bar assembly 300 and may be drawn out through the main frame 320 to be electrically connected to each other by the bus bar 340.

In the present specification, an outer surface of the main frame 320 may refer to an opposite side to a side at which the battery cells 200 are disposed, and an inner surface may refer to the side at which the battery cells 200 are disposed.

The main frame 320 may include a plurality of the slit portions 151 to accommodate the electrode leads 220 of the battery cells 200. The electrode leads 220 extending from each battery cell 200 may be inserted and drawn out through each slit portion 151.

The bus bar 340 configured to electrically connect the electrode leads 220 drawn out through the slit portions 151 may be mounted on the outer surface of the main frame 320.

A plurality of the inner frames 360 spaced apart from each other may be coupled to the inner surface of the main frame 320 to guide the electrode lead 220 to the slit portion 151. A spacing distance between the inner frames 360 may be from 0.1 mm to 10 mm.

Figure 10:
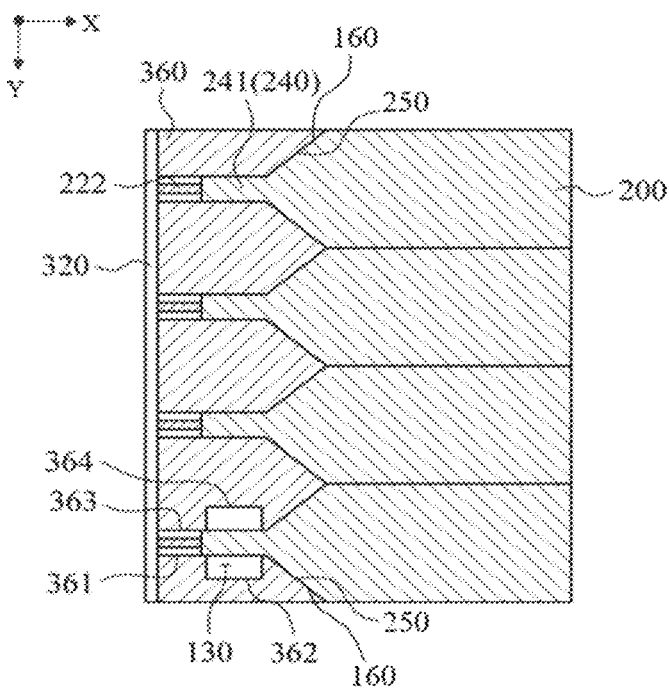
FIGS. 10 and 11 are schematic cross-sectional views illustrating battery modules in accordance with exemplary embodiments.
Figure 11:
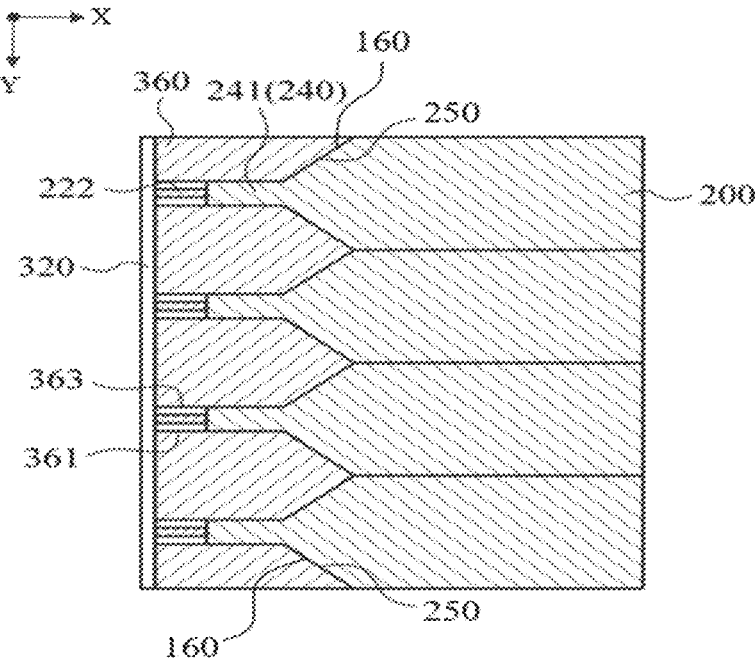

FIGS. 10 and 11 are schematic cross-sectional views illustrating battery modules in accordance with exemplary embodiments.

For example, FIG. 10 is a cross-sectional view of the battery module 400 taken along a line B-B' of FIG. 9 in a Y-axis direction. In a region including a cut surface along the line B-B' of the battery module 400, the inner frame 360 may include the ventilation guiding portion 130.

FIG. 11 is a cross-sectional view of the battery module 400 taken along a line A-A' of FIG. 9 in the Y-axis direction. In a region including a cut surface of the line A-A' of the battery module 400, the inner frame 360 may include the ventilation control portion 140 (a space formed between inner frames 360).

Referring to FIG. 10 together with FIG. 9, a plurality of the inner frames 360 may be disposed by a predetermined interval along a direction (an X-axis direction) in which the plurality of the battery cells 200 are stacked. The battery cell 200 may be interposed between the inner frames 360.

In an embodiment, the inner frames 360 and the battery cells 200 may be alternately and repeatedly arranged. At least one of the inner frames 360 may include the ventilation guide portion 130 recessed at a surface facing the adjacent inner frame 360.

Additionally, the terrace restraining portion 160 including an inclined surface may be formed at a surface adjacent to the surface where the ventilation guiding portion 130. The terrace restraining portion 160 may fix or hold or support the battery cell 200 by directly contacting a portion of the battery cell 200 to control the ventilation when the pouch is expanded by gas.

In some embodiments, an inclination angle of the inclined surface of the terrace restraining portion 160 may be from 5° to 50°. In the above range, the terrace restraining portion 160 may easily contact the terrace portion 250 of the battery cell to more effectively suppress the pouch expansion.

As illustrated in FIG. 10, at least one inner frame (a first inner frame) of the plurality of the inner frames 360 may have a first inner frame facing surface 361 facing the adjacent inner frame (a second inner frame). The first inner frame facing surface 361 may include a first inner ventilation guide surface 362. The first inner ventilation guide surface 362 may be formed by a portion of the first inner frame facing surface 361 being recessed.

The second inner frame may include a second inner frame facing surface 363 facing the first inner frame. The second inner frame facing surface 363 may include a second inner ventilation guide surface 364. The second inner ventilation guide surface 364 may be formed by a portion of the second inner frame facing surface 363 being recessed.

The ventilation guiding portion 130 may be formed between the first inner ventilation guide surface 362 and the second inner ventilation guide surface 364.

In some embodiments, all of the plurality of the inner frames 360 may include the ventilation guiding portion having a recessed shape at a surface facing the neighboring inner frame.

In some embodiments, the terrace restraining portion may be formed in all of the plurality of the inner frames 360.

In some embodiments, the ventilation guiding portion 130 may be adjacent to one end of the slit portion 151, and may be opened to the outside of the inner frame 360.

In some embodiments, an inner shape of the ventilation guiding portion 130 may be, e.g., a cylindrical shape, a semi-cylindrical shape, a funnel shape or a polygonal pillar shape.

The number, shape, size, and location of the ventilation guiding portion 130 formed in the inner frame 360 may be appropriately modified within a range capable of controlling the ventilation generated in the battery cell 200.

The ventilation guiding portion 130 and the ventilation control portion 140 may have substantially the same structure and shape as those of the ventilation device 100 as described with reference to FIGS. 1 to 7.

When the electrode lead 220 of the battery cell 200 is inserted into the slit portion 151 of the bus bar assembly 300, at least a portion of the electrode lead 220 and the sealing portion 240 of the battery cell 200 may be located in the ventilation control portion 140. For example, the side sealing portion 241 may directly contact at least a portion of the inner frame facing surfaces 361 and 363 in the ventilation control portion 140.

Referring to FIG. 11, the side sealing portion 241 of the battery cell 200 may contact at least a portion of the first and second inner frame facing surfaces 361 and 363 in the ventilation control portion 140. Further, at least a portion of the terrace portion 250 may be in contact with the terrace restraining portion 160.

For example, a contact area of the side sealing portion 241 with the first and second inner frame facing surfaces 361 and 363 may be from 200 mm$^2$ to 20,000 mm$^2$, preferably 800 mm$^2$ to 20,000 mm$^2$.

In an embodiment, a contact area of the side sealing portion 241 with the first inner frame facing surface 361 may be from 50 mm$^2$ to 5,000 mm$^2$, and a contact area of the side sealing portion 241 with the second inner frame facing surface 363 may be from 50 mm$^2$ to 5,000 mm$^2$. In the above range, the occurrence of the ventilation may be more effectively delayed or suppressed.

For example, the side sealing portion 241 may contact the inner frame facing surfaces 361 and 361 in each of the first busbar assembly 300a and the second busbar assembly 300b disposed at one end and the other end of the battery module 400, respectively.

For example, a contact area between the terrace portion 250 and the terrace restraining portion 160 may be from 100 mm$^2$ to 10,000 mm$^2$. In the above range, the occurrence of the ventilation may be more effectively delayed or suppressed.

As described with reference to FIG. 10, in the ventilation guiding portion 130 formed in the inner frame 360, the inner frame facing surfaces 361 and 363 and the side sealing portion 241 may not contact each other, and thus a space for an expansion of the pouch 230 may be provided when a gas is generated in the pouch 230 of the battery cell 200. In an embodiment, when an internal pressure becomes equal to or greater than an adhesive force of the sealing portion 240 by the gas at the sealing portion 240 of the pouch 230, the sealing portion 240 may be opened and the gas may be exhausted to the outside.

In exemplary embodiments, the battery cell 200 may be a lithium secondary battery. The battery cell 200 may include the pouch 230 and the electrode assembly 210 as described above. The electrode assembly 210 may include repeatedly stacked electrodes and a separation layer disposed between the electrodes. Each of the electrodes may include an active material layer formed on an electrode current collector.

The electrodes may include an anode and a cathode. The electrode current collector may include a cathode current collector included in the cathode electrode and an anode current collector included in the anode. The active material layer may include a cathode active material layer included in the cathode and an anode active material layer included in the anode.

The cathode may include the cathode current collector and the cathode active material layer formed by coating a cathode active material on the cathode current collector. The cathode active material may include a compound capable of reversibly intercalating and de-intercalating lithium ions.

In some embodiments, the cathode active material may include lithium-transition metal composite oxide particles. Examples of a lithium-transition metal composite oxide contained in the lithium-transition metal composite oxide particles may include a lithium-manganese-based oxide, a lithium-cobalt-based oxide, a lithium-nickel-based oxide, a lithium-manganese-cobalt-based oxide, etc.

In some embodiments, the lithium-transition metal composite oxide particle may include nickel (Ni), and may further include at least one of cobalt (Co) and manganese (Mn).

For example, the lithium-transition metal composite oxide particle may be represented by Chemical Formula 1 below.

$$Li_xNi_{1-y}M_yO_{2-z}X_a \qquad \text{[Chemical Formula 1]}$$

In Chemical Formula 1, $0.9 \leq x \leq 1.1$, $0 \leq y \leq 0.7$, $-0.1 \leq z \leq 0.1$ and $0 \leq a \leq 0.1$. M may include at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr, and X may represent an element selected from O, F, S and P.

In some embodiments, a molar ratio (1-y) of nickel in Chemical Formula 1 may be in a range from 0.8 to 0.95. In this case, power and capacity may be increased through a high-nickel (High-Ni) cathode composition. As a content of nickel included in the cathode active material increases, generation of a gas due to a side reaction between the cathode active material and an electrolyte may be increased. In exemplary embodiments, a ventilation of the gas may be efficiently controlled using the above-described ventilation device 100.

The cathode current collector may include a metallic material that may have no reactivity in a charge/discharge voltage range of the lithium secondary battery and may be easily applied and adhered to the electrode active material. For example, the cathode current collector may include, e.g., stainless steel, nickel, aluminum, titanium, copper, zinc or an alloy thereof, preferably aluminum or an aluminum alloy.

For example, a slurry may be prepared by mixing and stirring the cathode active material in a solvent with a binder, a conductive material and/or a dispersive agent. The slurry may be coated on the cathode current collector, and then dried and pressed to form the cathode including the cathode active material layer.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous-based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as LaSrCoO$_3$ or LaSrMnO$_3$, etc.

The anode may include the anode current collector and the anode active material layer formed by coating an anode active material on the anode current collector.

The anode active material may include any widely known material capable of adsorbing and desorbing lithium ions. For example, a carbon-based material such as a crystalline carbon, an amorphous carbon, a carbon composite material, a carbon fiber, etc.; a lithium alloy; or a silicon (Si)-based active material may be used.

The anode current collector may include stainless steel, copper, nickel, aluminum, titanium, or an alloy thereof. Preferably, the anode current collector may include copper or a copper alloy.

For example, a slurry may be prepared by mixing and stirring the anode active material with a binder, a conductive material, a thickener, etc., in a solvent. The slurry may be coated on the anode current collector, and then dried and pressed to form the anode including the anode active material layer.

The binder and the conductive material substantially the same as or similar to those used in the cathode active material layer may also be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer may be interposed between the cathode and the anode. The separation layer may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer may also include a non-woven fabric formed from a glass fiber with a high melting point, a polyethylene terephthalate fiber, or the like.

In exemplary embodiments, an electrode cell may be defined by the cathode, the anode and the separation layer, and a plurality of the electrode cells may be stacked to form the electrode assembly that may have e.g., a jelly roll shape. The electrode assembly may be accommodated together with the electrolyte in the pouch to define the battery cell (the lithium secondary battery). In exemplary embodiments, a non-aqueous electrolyte may be used as the electrolyte.

The non-aqueous electrolyte solution may include a lithium salt and an organic solvent. The lithium salt may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2$ $N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The electrode current collector may include a notched portion. The notched portion may serve as, e.g., an electrode tab. The notched portion may include a cathode notched portion protruding from the cathode current collector and an anode notched portion protruding from the anode current collector.

The electrode lead may be electrically connected to the notched portion and may be exposed to the outside of the pouch. The electrode lead may serve as an external connection lead for applying power to the secondary battery. Further, the electrode lead may include a cathode electrode lead and an anode lead.

A position of the ventilation device 100 may be properly modified in consideration of a structure of the pouch-type secondary battery.

In some embodiments, the cathode lead and the anode lead may be disposed on both opposite sides of the secondary battery. In this case, the ventilation device 100 may also be disposed at both sides of the secondary battery.

In some embodiments, the cathode lead and the anode lead may be welded together at one side of the pouch. In this case, the ventilation device 100 may also be disposed at the one side of the secondary battery.

The foregoing is illustrative of example embodiments and is not to be construed as limitations to the disclosed technology. Although a few example embodiments have been described, various modifications to the disclosed example embodiments and other embodiments may be made based on what is disclosed in this patent document.

What is claimed is:

1. A battery module, comprising:
a plurality of battery cells stacked on each other, each of the plurality of battery cells comprising an electrode lead; and
a bus bar assembly coupled to the electrode leads of the plurality of battery cells to connect the plurality of battery cells to each other, wherein the bus bar assembly comprises:
a main frame comprising a slit portion into which the electrode leads of the plurality of battery cells are inserted;
a bus bar mounted on an outer surface of the main frame to electrically connect the electrode leads to each other; and
a plurality of inner frames spaced apart from each other on an inner surface of the main frame to guide the electrode lead to the slit portion,
wherein the plurality of inner frames comprises a first inner frame and a second inner frame neighboring each other with a space therebetween as a ventilation control portion, and the first inner frame comprises a ventilation guiding portion that is recessed from a surface facing the second inner frame and is connected to the ventilation control portion,
wherein the plurality of battery cells each includes an electrode assembly and a pouch for accommodating the electrode assembly,
wherein the pouch includes a sealing portion formed outside the electrode assembly and a pouch terrace portion adjacent to the sealing portion,
wherein the plurality of inner frames includes a terrace restraining portion including an inclined surface structured to support the pouch terrace portion of the plurality of battery cells and formed at a surface of the first inner frame adjacent to a surface including the ventilation guiding portion,
wherein the pouch terrace portion is formed to be inclined and supported by the terrace restraining portion to suppress expansion.

2. The battery module of claim 1, wherein the first inner frame includes a first inner frame facing surface facing the second inner frame, and a first inner ventilation guiding surface recessed from the first inner frame facing surface, the second inner frame includes a second inner frame facing surface facing the first inner frame, and a second inner ventilation guiding surface recessed from the second inner frame facing surface, and the ventilation guiding portion is formed between the first inner ventilation guiding surface and the second inner ventilation guiding surface.

3. The battery module of claim 2, wherein the electrode lead and the sealing portion are at least partially located in the ventilation control portion.

4. The battery module of claim 3, wherein at least a portion of the sealing portion is in contact with at least a portion of the first inner frame facing surface and the second inner frame facing surface in the ventilation control portion.

5. The battery module of claim 4, wherein:

the sealing portion comprises a side sealing portion sealing an end from which the electrode lead is drawn out, and a main sealing portion sealing a side from which the electrode lead is not drawn out;

the main sealing portion has a folding portion in which the pouch is folded at an edge thereof; and a contact area of the side sealing portion with the first inner frame facing surface and the second inner frame facing surface ranges from 200 mm$^2$ to 20,000 mm$^2$.

6. The battery module of claim 3, wherein at least a portion of the pouch terrace portion is in contact with the terrace restraining portion.

7. The battery module of claim 6, wherein a contact area between the pouch terrace portion and the terrace restraining portion is from 100 mm$^2$ to 10,000 mm$^2$.

8. The battery module of claim 1, wherein an inclination angle of the inclined surface of the terrace restraining portion ranges from 5° to 50°.

9. The battery module of claim 1, further comprising a cap fitted to the ventilation guiding portion.

10. The battery module of claim 1, wherein the slit portion includes a sub-venting hole having the same shape as a shape of the ventilation guiding portion at a position corresponding to the ventilation guiding portion.

* * * * *